Oct. 4, 1932.  J. R. THORP  1,880,582
VISOR
Filed April 27, 1931
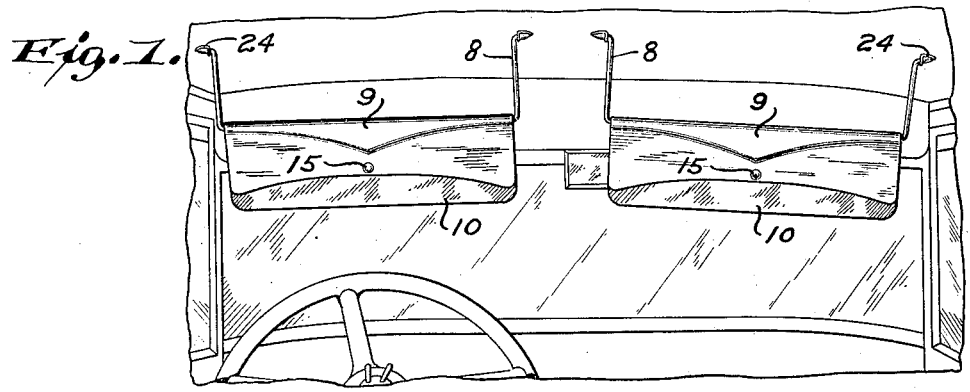
Fig. 1.
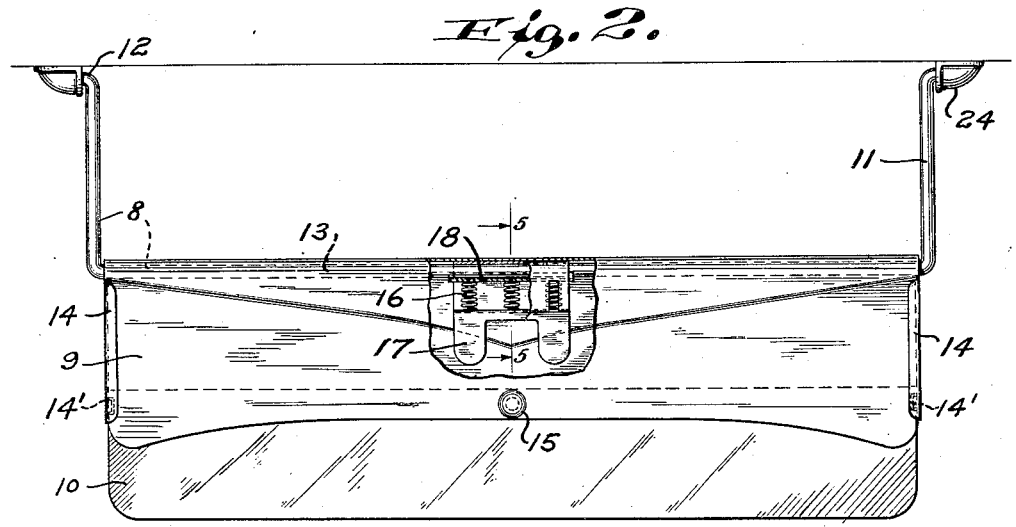
Fig. 2.
Fig. 3. Fig. 4. Fig. 5.
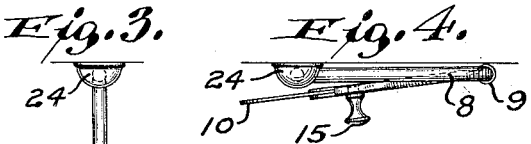
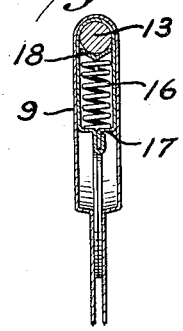
Fig. 6. Fig. 7.
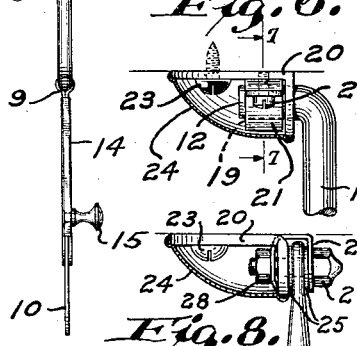
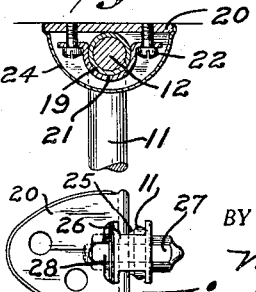
Fig. 8. Fig. 9.
INVENTOR.
J. R. Thorp
BY Morsell & Morsell
ATTORNEY.

Patented Oct. 4, 1932

1,880,582

UNITED STATES PATENT OFFICE

JOEL R. THORP, OF WEST ALLIS, WISCONSIN, ASSIGNOR TO THE FULTON COMPANY, OF WEST ALLIS, WISCONSIN, A CORPORATION OF WISCONSIN

VISOR

Application filed April 27, 1931. Serial No. 533,088.

The present invention relates generally to improvements in protective devices for the occupants of vehicles, and relates more specifically to improvements in the construction and operation of visors for protecting the eyes of individuals within an automobile or the like, against objectionable glare from the sun or from other strong light such as the headlights of an approaching car.

Generally stated, an object of the invention is to provide an improved glare shield which is simple in construction, and which is moreover highly efficient in operation.

It has heretofore been proposed to provide various forms of appliances for protecting the eyes of occupants of a vehicle from objectionable light and glare. For automobile use, it has been a common expedient to provide relatively small and universally adjustable shields attachable within a car, which could be manipulated by the driver or other occupant to obviate local glare or reflection. These prior devices were usually attached to some rigid portion of the car structure and were supported by means of a pivoted arm usually of telescopic construction, the entire assemblage being relatively frail and rather ineffective because of the restricted size of the shields and the resultant limitation in the range of action thereof. Another form of device previously employed as a protection against sun glare, is the visor which is ordinarily attached to the upper front external portion of the machine, directly above the windshield. This visor, while partially accomplishing its purpose, is useless when the sun approaches the horizon, and is also useless as a protection against glare from approaching headlights. It is a more specific object of the present invention to provide a single appliance which will effectively accomplish the purpose of both the prior glare shields and visors.

Another specific object of the invention is to provide a relatively small and compact visor, or visorette, which is adapted to serve each individual or row of individuals, seated one in back of the other, within a vehicle enclosure.

Still another specific object of the invention is to provide an improved anti-glare device which may be readily applied to standard car enclosures, which may be conveniently manipulated, and which may be disposed completely out of the way when not in use.

A further specific object of the invention is to provide a compact and strong adjustable visor, and means for effectively maintaining the same in various positions of adjustment.

Another specific object of the invention is to provide a visor of neat appearance which may be manufactured and sold at minimum cost.

These and other objects and advantages of the present invention will appear from the following detailed description.

A clear conception of an embodiment of the invention and of the mode of constructing and of manipulating visorettes built in accordance therewith, may be had by referring to the drawing accompanying and forming a part of this specification, in which like reference characters designate the same or similar parts in the various views:

Fig. 1 is a rear view of several of the improved visors, showing the same applied to the top bow of an automobile enclosure, the view being taken from the driver's seat;

Fig. 2 is an enlarged rear view of one of the visors, a portion thereof having been broken away to show details of internal construction;

Fig. 3 is a similarly enlarged end view of the visor, showing the shield thereof in lowermost extended or depending position;

Fig. 4 is a similarly enlarged end view of the visor, showing the same partly folded up;

Fig. 5 is a further enlarged transverse section through the carrier element and its supporting member, the section being taken along the line 5—5 of Fig. 2;

Fig. 6 is a similarly further enlarged side elevation of the pivotal mounting for the shield supporting member showing in section one of the enclosure caps therefor;

Fig. 7 is a similarly enlarged transverse section through the pivotal mounting of Fig.

6, the section being taken along the line 7—7 of Fig. 6.

Fig. 8 is a similarly enlarged side elevation of a modified form of pivotal mounting for the shield supporting member showing the closure cap thereof in section; and Fig. 9 is a top view of the modified pivotal mounting of Fig. 8.

The improved miniature visor or visorette specifically shown in the drawing by way of illustration, comprises in general a swingable U-shaped supporting member 8 formed of wire or the like, a sheet metal carrier element 9 pivotally associated with the member 8, and a transparent shield 10 preferably formed of colored celluloid secured to the swinging edge of the element 9.

The wire supporting member 8 consists of a pair of laterally spaced side legs 11 which may either have alined pivot ends 12 as shown in Figs. 6 and 7, or be formed as shown in Figs. 8 and 9, the legs being connected at their swinging ends by means of an integral intermediate portion 13 which is disposed parallel to the common axis of the ends 12. The carrier element 9 is formed of a single sheet of material wrapped around the intermediate portion 13 of the member 8 and secured thereto by integral end flanges 14 and locking lugs 14'. The transparent shield 10 is clamped between the portions of the walls of the element 9 remote from the pivot portion 13 of the member 8, by means of the flanges 14, the lugs 14', and also by means of the rivet which serves as an attachment for a manipulating handle 15 disposed midway between the flanges 14, see Figs. 2, 3 and 4.

While the sheet metal element 9 and the shield 10 associated therewith, are freely angularly adjustable about the intermediate portion 13 of the member 8, the element 9 and member 8 are frictionally retained in various positions of relative adjustment by means of compression springs 16 shown in Figs. 2 and 5. The friction springs 16 are mounted within a spring housing 17 which embraces the medial part of the intermediate member portion 13 and is concealed within the mid portion of the carrier element 9. The springs 16 react at their outer ends against an internal surface of the housing 17, and at their inner ends these springs engage a friction plate 18 which coacts directly with the member portion 13 so as to resiliently clamp the portion 13 between the curved end wall of the housing 17 and the plate 18.

In Figs. 6 and 7, the pivot ends 12 of the member 8, are snugly embraced by fiber bushings 19 which may be clamped between supporting brackets 20 and flexible caps 21, by means of machine screws 22. By adjusting the screws 22, any desired resilient clamping pressure may be established upon the bushings 19 so as to firmly retain the swinging member 8 in any desired position of angular adjustment. The brackets 20 may be secured to the automobile bow at the top of the car by means of screws 23, and closure covers 24 serve to normally conceal the bearings and screws associated with the pivot ends 12. The covers 24 are formed of sheet metal, being snapped in place and readily removable.

In Figs. 8 and 9, the pivot ends of the legs 11 are disposed between fiber washers 25 which are clamped between U-shaped spring elements 26 and the adjacent brackets 20, by means of clamping bolts 27. By adjusting the nuts 28 on these bolts, any desired resilient clamping pressure may be secured.

After the visorette has been properly attached to the enclosure of a car shown in Fig. 1, the shield 10 may be readily adjusted to any desired height and to any desired angular position, within the limits fixed by the supporting member 8. When the device is positioned as shown in Fig. 3, the shield 10 is in its lowermost position, and the member 8 and carrier element 9 may be folded up against the top of the car as shown in Fig. 4, when not in use. The springs 16, bushings 19, and washers 25 obviously serve to retain the visor in any desired position of adjustment, these holding devices being entirely concealed from view. The visorette may be utilized in multiple as shown in Fig. 1 in order to accommodate all of the individuals within the car, and adjustment of the shields may be quickly and conveniently effected.

The construction of the improved visorette is obviously such that the device may be produced at minimum cost. The supporting member 8 is formed of standard wire, and most of the remaining elements may be formed of standard sheet metal. A relatively narrow strip serves to produce the transparent shields 10, and these shields are effectively held in position by the flanges 14 and the handle 15. The device furthermore presents an extremely neat appearance and has proven highly successful in commercial operation.

It should be understood that it is not desired to limit the invention to the exact details of construction herein shown and described, for various modifications within the scope of the claims may occur to persons skilled in the art.

It is claimed and desired to secure by Letters Patent:

1. In combination, a U-shaped supporting member having alined laterally spaced pivots and an intermediate pivot portion swingable about the axis of alinement of said end portions, a carrier element pivotally associated with said intermediate pivot portion, means within said element and coacting only with the medial portion of said intermediate pivot portion to frictionally retain said element in various positions of adjustment, and a transparent shield secured to said element remote from said intermediate pivot portion.

2. In combination, a one-piece supporting member having spaced end projections swingable about a common axis, means cooperable with said end projections for frictionally retaining said member in various positions of adjustment, a carrier element swingable upon said member between said end portions, means concealed within said element and coacting with said member midway between said projections to frictionally retain said element in various positions of adjustment relative to said member, and a transparent shield secured to said element.

In testimony whereof, I affix my signature.
JOEL R. THORP.